United States Patent [19]

Pesch

[11] 4,456,120

[45] Jun. 26, 1984

[54] MAT-FORMING INSTALLATION FOR PRESSEDBOARD

[75] Inventor: Jürgen Pesch, Krefeld-Traar, Fed. Rep. of Germany

[73] Assignee: G. Siempelkamp GmbH & Co., Krefeld, Fed. Rep. of Germany

[21] Appl. No.: 318,452

[22] Filed: Nov. 5, 1981

[30] Foreign Application Priority Data

Nov. 7, 1980 [DE] Fed. Rep. of Germany ....... 3042005

[51] Int. Cl.³ ............ B65G 49/00

[52] U.S. Cl. ............ 198/648; 156/538; 425/373; 425/404; 425/470

[58] Field of Search ............ 198/793, 796, 382, 645, 198/648, 802, 844, 850, 851; 156/510, 538; 425/373, 363, 404, 470, 445, 446, 4 R, 149

[56] References Cited

U.S. PATENT DOCUMENTS

| | | | |
|---|---|---|---|
| 807,016 | 12/1905 | Burns | 198/793 |
| 1,227,182 | 5/1917 | Neal | 198/796 |
| 1,672,522 | 6/1928 | Greer et al. | 198/472 |
| 3,332,819 | 7/1967 | Siempelkamp | 198/366 |
| 3,989,581 | 11/1976 | Kober et al. | 198/802 |
| 4,055,265 | 10/1977 | Eisenman | 198/844 |

FOREIGN PATENT DOCUMENTS

| | | | |
|---|---|---|---|
| 1028045 | 4/1958 | Fed. Rep. of Germany | 198/802 |

*Primary Examiner*—Joseph E. Valenza

*Assistant Examiner*—Daniel Alexander

*Attorney, Agent, or Firm*—Karl F. Ross; Herbert Dubno

[57] ABSTRACT

A mat-forming installation for the production of pressedboard comprises a grate conveyor whose bars are carried by chains on opposite sides of the conveyor and define gaps at spaced-apart locations into which the headpiece (entraining beam) of a press underlay can fit. The headpiece is connected by a two-joint piano hinge structure to the underlay onto which the fibrous or particulate material is deposited to form the mat, the layer or mat being entrained into the piece on the underlay.

4 Claims, 5 Drawing Figures

MAT-FORMING INSTALLATION FOR PRESSEDBOARD

FIELD OF THE INVENTION

My present invention relates to conveyor systems for pressedboard mats and, more particularly, to a mat-forming installation or a conveyor system therefor, wherein a layer of particulate and/or fibrous material is formed on a press underlay for subsequent compression in the production of pressedboard.

BACKGROUND OF THE INVENTION

In the production of pressedboard, fibrous or particulate materials, e.g. of a cellulosic substance can be formed into layers having defined boundaries, i.e. mats, and subjected to heat and pressure to bond the fibers or particles in the presence of natural or added binders into more or less rigid structures generically referred to as pressedboard.

Depending upon the density of the materials, the degree of heat and pressure, the compression to which the mat is subjected and the nature of the fibers or particles and of the binder, the pressedboard can have a wide range of densities, porosities, rigidities and compressive and tensile strength.

Pressedboard fabricated in this manner can be utilized as insulation, as structural materials, as facing materials and in the fabrication of furniture, cabinetry and the like. It can be laminated with finishing foils or films to have smooth or embossed textures, natural or other patterns and various colors.

In general the mat is formed by depositing the particulate or fibrous material on a press underlay which is transported past the mat-forming stage on a conveyor, the underlay facilitating handling of the non-coherent or loosely coherent mass constituting the layer. This underlay can be used, for example, to carry the layer through stations in which laminates are applied or other treatments of the layer may be carried out and for carrying the layer into or depositing the layer within a press.

The pressedboards which are made in this manner include particleboard and fiberboard and frequently the underlay is composed of a web of a heat- and pressure-resistant material, e.g. metal screening or latticework which additionally applies a pattern to the pressedboard during its formation. In the discussion below reference may be made to this web as a screen since it is most usually a metallic lattice composed of wire, although the term is intended here to include any web which can serve as an overlay of support on which the layer can be built and which can be utilized to transport and/or press the layer.

The production of pressedboard in the manner described requires the use of single-platen or multiplaten presses, systems for charging and discharging these presses, conveyor systems for the transporting of the layers, and devices for forming the layer upon a surface with graded or non-graded dispensing of the fibers or particles.

Such systems may be used as are described in the commonly owned copending applications Ser. No. 127,572 of Mar. 6, 1980 (now U.S. Pat. No. 4,289,467), Ser. No. 207,429 of Nov. 17, 1980 (now U.S. Pat. No. 4,336,008), Ser. No. 238,709 of Feb. 27, 1981 (now U.S. Pat. No. 4,352,256), Ser. No. 259,675 of May 1, 1981 (now U.S. Pat. No. 4,412,801), and U.S. Pat. Nos. 3,565,725, 3,409,942, 3,413,145, 3,396,783, 3,332,819, 3,428,505, 3,241,189, 3,050,777, 3,224,758, 3,017,271, 3,050,200 and 3,860,381. Other art dealing with this subject matter can be found in the United States Patent Office Manual of Classification, classes and subclasses to which these patents and applications are assigned and in the files thereof.

Conventional systems in which the layer is built upon a flexible underlay have been found to have problems which have resulted in irregularities in the mat and hence irregularities in the pressedboard which results therefrom. Specifically, difficulties are encountered with the displacement of the underlay, generally where the fiber or particle-dispensing unit is stationary, because of bowing, wrinkling or folding of the underlay.

OBJECTS OF THE INVENTION

It is the principal object of the present invention to provide a conveyor system for particle or fiber layers adapted to be pressed to produce pressedboard, whereby the disadvantages of earlier systems are avoided.

Another object of this invention is to provide a conveyor arrangement which prevents bowing or folding of the underlay.

Still another object is to provide an apparatus for forming a mat or a layer for the purposes described on an underlay which will result in a production of more regular and uniform pressedboard.

SUMMARY OF THE INVENTION

I have found that the problems hitherto encountered in the displacement of a fiber or particle layer or mat and in the formation thereof can be avoided by a conveyor arrangement which comprises a traveling grate, i.e. wherein the conveyor chains are bridged by a succession of mutually parallel closely spaced bars collectively forming a grate on which the underlay can be disposed. At spaced-apart locations corresponding to the spacing of the heads of the underlays, which are beams, I provide the conveyor with head-receiving recesses, e.g. by omitting one or more bars so that in the gaps thus formed the beam by which the underlay is entrained. e.g. into the press or along the production path, can be recessed below the surface of the grate following the gap and upon which the underlay is disposed. At least the part of the beam to which the web of the underlay is affixed is thus recessed beneath the aforementioned surface and bulging, bowing or distortion of the web is precluded by connecting the web to the entrainment beam by a double-pivot hinge means, preferably in the form of a piano-type hinge having two pivots spaced apart in the direction of displacement of the traveling grate lying parallel thereto.

The piano-hinge structure can have a first connecting element which is secured to the aforementioned lower part of the entrainment beam and a second element which is secured to the web.

The hingedly interconnected elements of the piano hinge can be formed with interdigitating sleeves which are interconnected by the two pintles defining the hinge axes.

The piano hinge can be dimensioned with respect to the inter-bar gaps of the grate so that the web lies flat on the following surface of the grate without bowing or folding even in the region of the entrainment beam.

BRIEF DESCRIPTION OF THE DRAWING

The above and other objects, features and advantages of the present invention will become more readily apparent from the following description, reference being made to the diagrammatic drawing in which.

SPECIFIC DESCRIPTION

Figure 1:
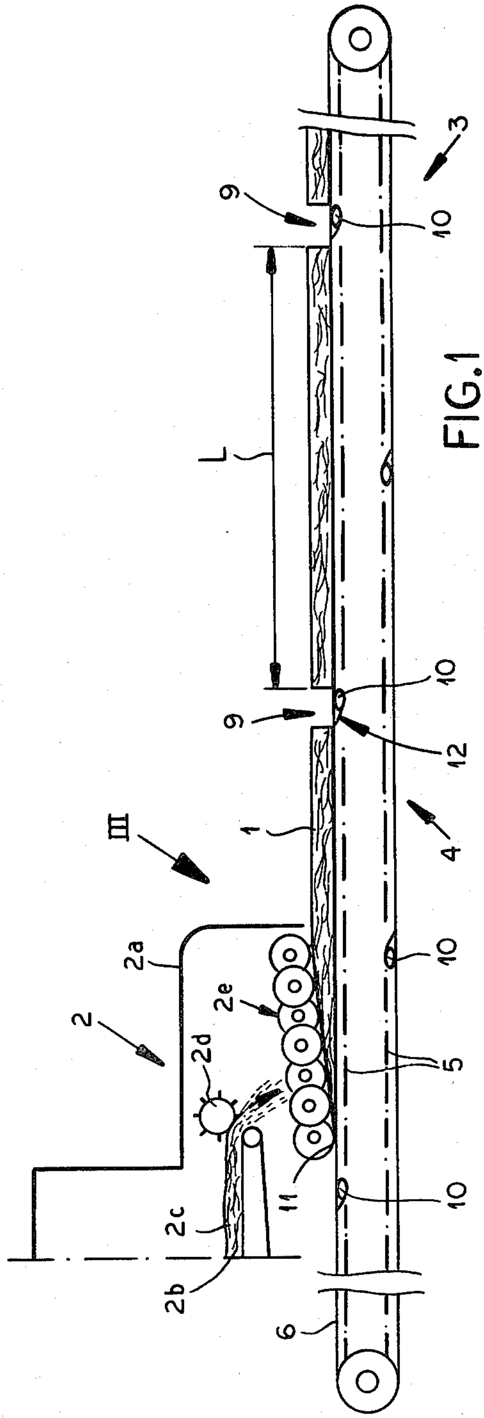
FIG. 1 is a side elevational view of a conveyor according to the invention utilized in the layer-building station in conjunction with a device for metering particles or fibers onto the underlays.

The conveyor shown in the drawing can be utilized not only for the formation of mats or layers of particles or fibers adapted to be transformed into pressedboard, but wherever such layers or mats must be transported prior to pressing in a pressedboard plant.

The plant can be provided with any of the units previously described for pressing the mats, laminating or otherwise treating them, and with any conventional means for preparing the particles and fibers.

In the drawing the fiber mats or layers have been represented at 1 and are formed upon underlays which comprise web 6 carrying these layers. Each web 6 may be composed of a screen or latticework, generally of metal, which can leave a complementary impression or pattern on the back of the pressedboard which is formed.

The underlays are displaced in succession along a transport pass represented generally at 3 beneath a stationary unit 2 which deposits the fibers or particles upon the underlay.

This unit 2 comprises a hood 2*a* enclosing a feed conveyor 2*b* only the discharge end of which has been shown and which carries a pile 2*c* of the particles and/or fibers over the discharge edge. A toothed drum 2*d* overlaying this edge scatters the particles onto distributor 2*e* made up of interfitting disks on respective shafts which are driven to uniformly deposit the particles or fibers with or without grading onto the underlay. When the array of disks 2*e* forms a grading screen, it is possible to selectively deposit fine particles in a lower layer on the underlay, coarser particles in an intermediate portion of the mat and fine particles on an upper portion of the mat so that fine particles form the upper and lower layers and sandwich a coarse-particle layer between them.

The path 3 can extend to a prepress at which the mat is preliminarily compacted before entering a heated platen press for the finish pressing stage.

Figure 2:
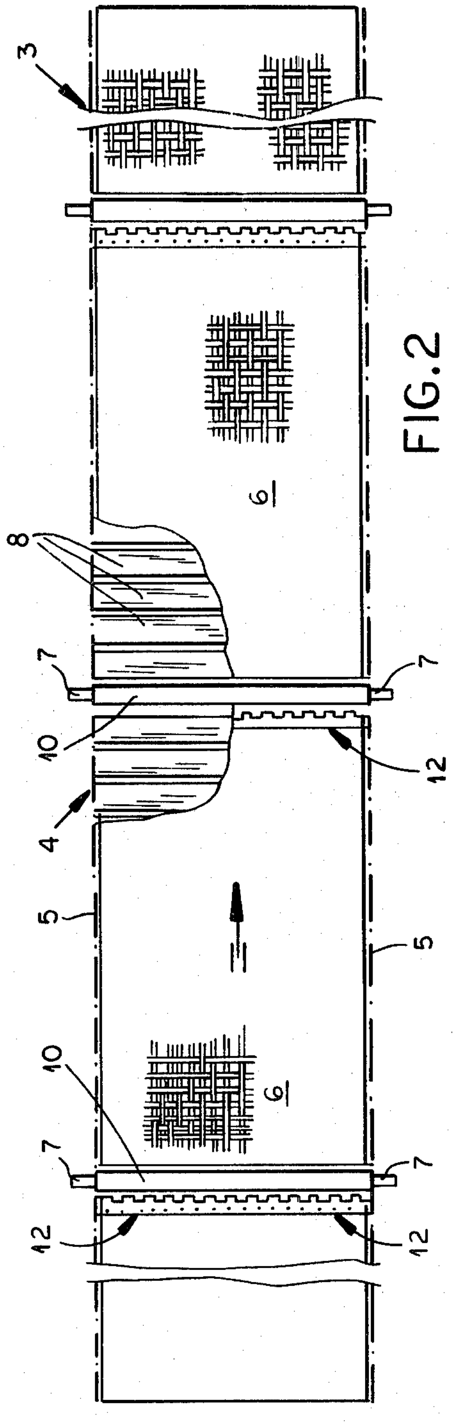
FIG. 2 is a plan view of the conveyor of FIG. 1.
Figure 3:
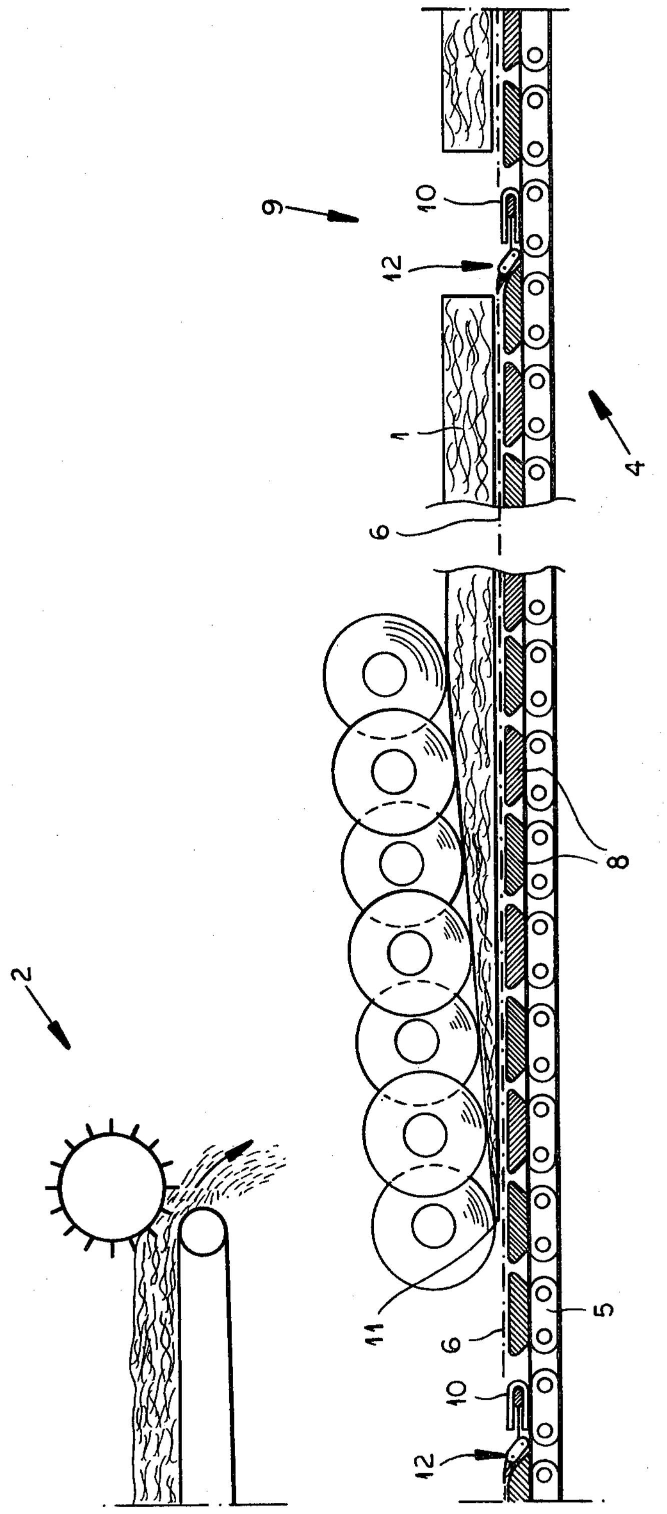
FIG. 3 is a side-elevational view, partly in section, of the region III of FIG. 1.
Figure 4:
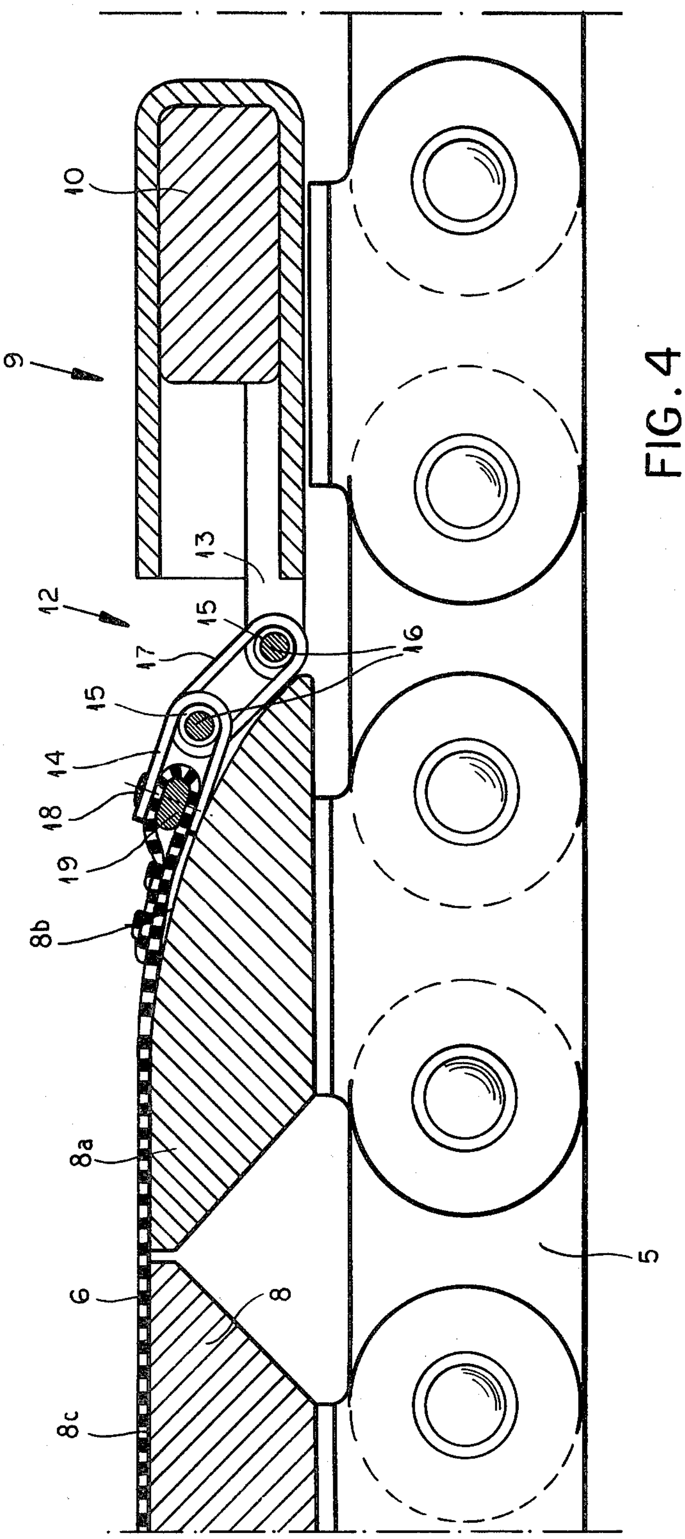
FIG. 4 is a transverse section in the region of the gap in the grate conveyor showing the relationship of the entrainment beam to the hinge and web.

The path 3 is formed by a conveyor 4 having two parallel and synchronously driven conveyor chains 5 which have been designated by dot-dash lines in FIGS. 1 and 2 but are shown with greater detail in FIG. 3 and FIG. 4.

The chains 5 are spanned by bars 8 forming a traveling grate, the bars 8 being omitted at spaced-apart locations or gaps 9 dimensioned to receive (see FIG. 4) beams 10 to which the webs 6 are connected and which have laterally projecting formations 7 whereby the underlays can be entrained, e.g. by engagement with entrainers formed on chains flanking the conveyor and lifting the beams 10 out of the gaps 9. Adjacent the gaps 9, the bar 8*a* has a rounded surface 8*b* which guides the web smoothly toward the bottom of the gap. The formations 7 enable the underlay to be drawn onto respective press platens.

The bars form a traveling grate with the chains 5 which defines a surface 8*c* supporting the web 6 adjacent and upstream of each gap 9 so that the web lies flat over its entire length and is free from bulging, bowing or folding.

The gaps 9 are spaced apart at distances L corresponding to the length of the mat (see FIG. 1) and hence the length of the mat-receiving portion of each web.

Figure 5:
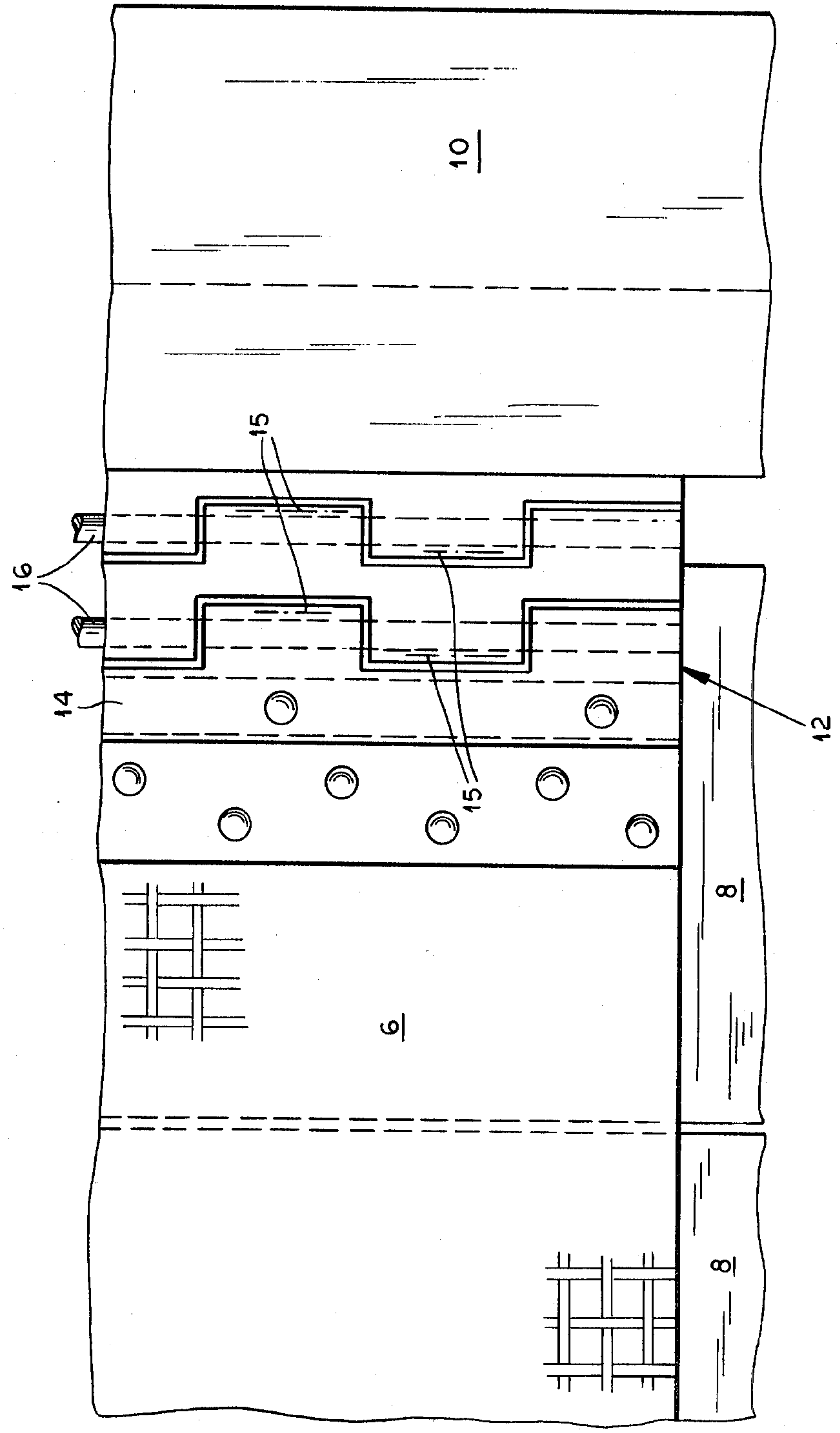
FIG. 5 is a plan view of the latter region.

As can be seen from FIGS. 4 and 5, each mat 6 is connected by a two-pivot piano hinge 12 to the lower part of the beam 10.

More specifically, the piano hinge 12 can include a lower member 13 which is affixed to the beam 10, an intermediate member 17 linked to member 13, and an upper member 14 connected by rivets 18 to a bead 19 formed at the leading edge of the web 6, the piano hinge and the beam extending the full width of the web 6.

The articulations between the length members 13 and 17 and the linked members 17 and 14 are formed by the interdigitated sleeves 15 which are traversed by pintles 16 likewise extending the full width of the web.

The hinge 12 prevents upward bowing of the leading edge of the web and the flat lie thereof permits the lower edge 11 of the layer-forming machine to lie as close as possible to the surface of the web and thus ensures uniform fold-free orientation of the web and uniform layers.

I claim:

1. A conveyor for mats of comminuted material adapted to be transformed into pressedboard, said conveyor comprising:

a traveling grate comprising a pair of spaced-apart synchronously driven endless chains spanned by closely spaced mutually parallel grate bars defining a flat surface at least over a portion of a pass of said conveyor, said surface being formed with gaps at spaced-apart locations therealong formed by omission of at least one grate bar at each gap; and respective underlays to receive said mats and comprising entrainment beams received in the respective gaps and removably resting on said chains, a flexible web connected to each beam and overlying said surface upstream therefrom, said beams each having a lower portion which while lying in the respective gap is below said surface, and respective two-articulation piano hinges connecting each web to the respective beam whereby said webs lie flat against said surface, each of said piano hinges comprising a lower member connected to the respective lower portion of the respective beam below said surface, an upper member connected to the respective web and an intermediate member between said upper and lower members.

2. The conveyor defined in claim 1 wherein said upper and intermediate members have mutually interdigitating sleeves traversed by a common pintle.

3. The conveyor defined in claim 1 wherein said lower and intermediate members have mutually interdigitating sleeves traversed by a common pintle.

4. The conveyor defined in claim 1, claim 2 or claim 3 wherein said surface is disposed beneath a dispenser for comminuted material whereby said mats are deposited on said webs.

* * * * *